United States Patent
Khachane et al.

(10) Patent No.: US 11,899,625 B2
(45) Date of Patent: Feb. 13, 2024

(54) SYSTEMS AND METHODS FOR REPLICATION TIME ESTIMATION IN A DATA DEDUPLICATION SYSTEM

(71) Applicant: EMC IP Holding Company LLC, Hopkinton, MA (US)

(72) Inventors: Hemant P. Khachane, Sunnyvale, CA (US); Banuprakash Ganga Muniyappa, Mountain House, CA (US); Paul J. Hammer, Livermore, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 256 days.

(21) Appl. No.: 17/305,115

(22) Filed: Jun. 30, 2021

(65) Prior Publication Data
US 2023/0004534 A1    Jan. 5, 2023

(51) Int. Cl.
G06F 16/17    (2019.01)
G06F 16/174    (2019.01)
G06F 12/02    (2006.01)

(52) U.S. Cl.
CPC ...... G06F 16/1756 (2019.01); G06F 12/0253 (2013.01); *G06F 2212/7205* (2013.01)

(58) Field of Classification Search
CPC .................................................. G06F 16/1756
See application file for complete search history.

(56) References Cited

U.S. PATENT DOCUMENTS

| 2008/0005349 | A1* | 1/2008 | Li | H04L 65/611 |
| | | | | 709/231 |
| 2015/0134723 | A1* | 5/2015 | Kansal | G06F 11/3419 |
| | | | | 709/203 |

OTHER PUBLICATIONS

Otmar, Ertl, "New cardinality estimation algorithms for HyperLogLog sketches", downloaded from https://oertl.github.io/hyperloglog-sketch-estimation-paper/paper/paper.pdf, Apr. 3, 2017, 56 pages total.

Flajolet, Philippe, et al., "HyperLogLog: the analysis of a near-optimal cardinality estimation algorithm", Discrete Mathematics and Theoretical Computer Science (DMTCS), 2007 Conference on Analysis of Algorithms, A of A 07, DMTCS proc. AH, 2007, pp. 127-146.

(Continued)

*Primary Examiner* — Baoquoc N To
(74) *Attorney, Agent, or Firm* — WOMBLE BOND DICKINSON (US) LLP

(57) ABSTRACT

Systems and methods for of determining a replication time in a deduplicated file system are disclosed. Maximum streams are determined based on a number of allocated streams on a source node and a number of allocated streams on a target node. An available network bandwidth between the source node and the target node is determined. A delta time is estimated based at least on one or more duplicate fingerprints between a logical space unit of the source node and the target node by using at least one source smart filter and at least one target smart filter. The replication time is determined based on the maximum streams, the available network bandwidth between the source and target nodes, the estimated delta time, and a number of unique fingerprints that exist between the logical space unit of the source node and the target node.

20 Claims, 5 Drawing Sheets

(56) References Cited

OTHER PUBLICATIONS

Grzywinski, Rob, et al., "GitHub—aggregateknowledge/js-hll: JavaScript library for the HyperLogLog algorithm", downloaded from https://github.com/aggregateknowledge/js-hll, last updated Dec. 23, 2013, 6 pages total.

Huele, Stefan, et al., "HyperLogLog in Practice: Algorithm Engineering of a State of The Art Cardinality Estimation Algorithm", EDBT/ICDT '13, Mar. 18-22, 2013, Genoa Italy, 10 pages total.

* cited by examiner

SYSTEMS AND METHODS FOR REPLICATION TIME ESTIMATION IN A DATA DEDUPLICATION SYSTEM

FIELD OF THE INVENTION

Embodiments of the present disclosure relate generally to data storage systems. More particularly, embodiments of the invention relate to replication time estimation in a data deduplication system.

BACKGROUND

In a data deduplication system, it is difficult to predict an accurate probabilistic time required for the completion of logical replication due to the following:
(1) There is no direct method to identify the unique segments that exist between a source node (e.g., storage unit) and a destination or target node (e.g., another storage unit), and also the common/shared segments across those source and destination nodes.
(2) The estimation for a replication completion time based on a logical capacity of a logical space unit (e.g., Mtree) is inaccurate due to unknown factors of uniqueness that exist between the source node and the destination node. The logical capacity of the logical space unit can have many common segments that exist on a destination node, and thus, providing statistics based on the logical capacity or size are inaccurate due to local area network (LAN) optimization on deduplication-based systems.
(3) Other factors such as a number of data streams varying on the source and destination nodes, network bandwidth, data transferred at a given time, data remaining at a given time, and new incoming data are also important to consider.

Moreover, a data deduplication system provides a logical space unit (e.g., Mtree) that provides an independent namespace and is a logical partition of a deduplicated file system. The logical space unit can be used as a common Internet file system (CIFS) share and/or a network file system (NFS) export storage unit. Also, the data deduplication system can have several logical space units (e.g., Mtrees) that may share a physical space due to deduplication. In order to protect backed up data, different types of logical and physical replication are used. For a logical replication, the most widely types of replication used are M-tree replication, manage file replication, and directory replication.

Unfortunately, deduplication presents a problem as it is difficult to determine the physical capacity of a logical space unit (e.g., Mtree). As such, it is difficult to determine how much time a logical replication will take to complete so that a customer can provision and schedule their resources in order to schedule a backup or system workload appropriately.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
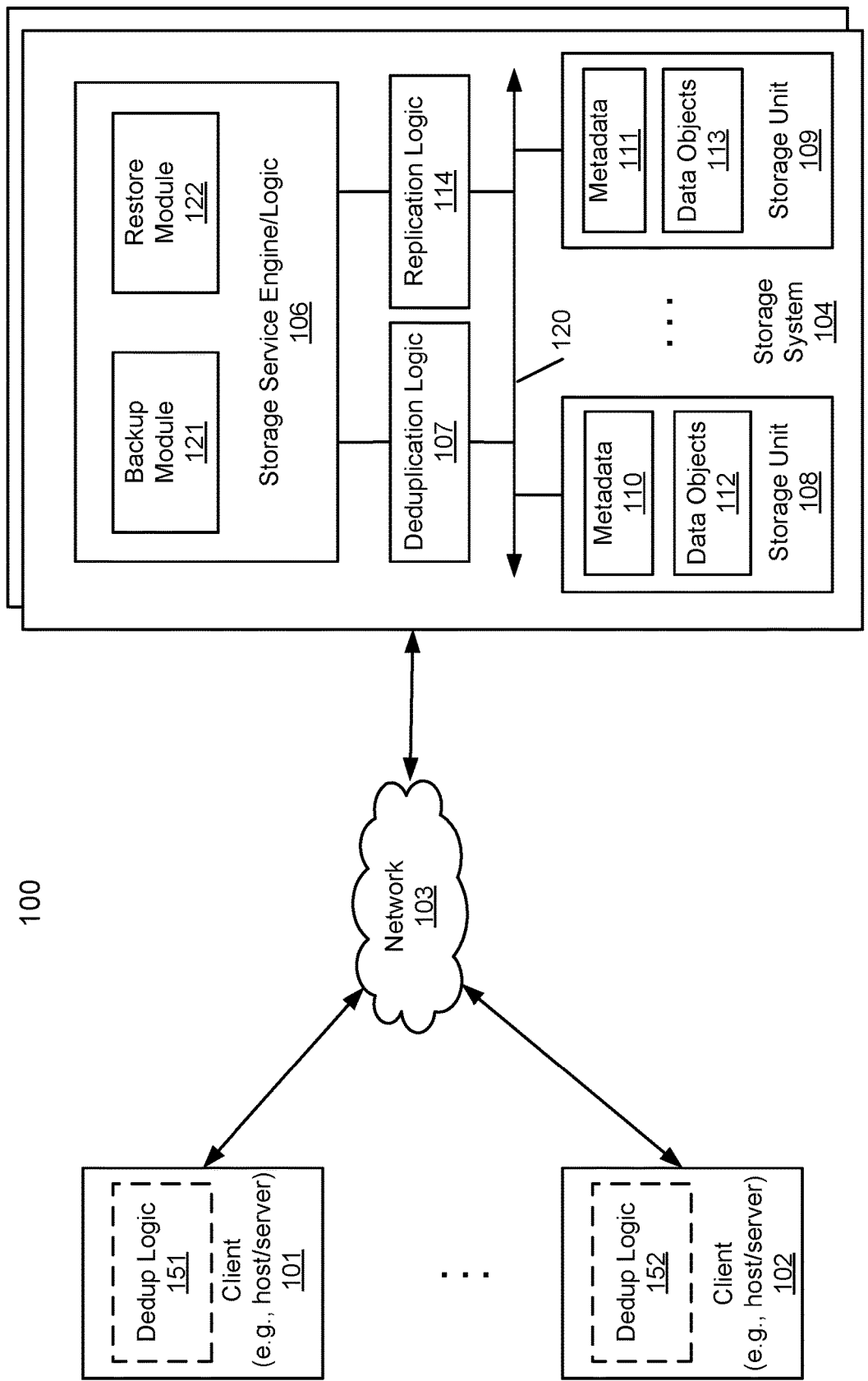
FIG. 1 is a block diagram illustrating a storage system according to an embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the disclosure seek to solve the above described problem by using a smart algorithm and a compact in-memory data structure that uses extremely efficient space and predicts the best accuracy (e.g., with error rate<1) along with the characterization of existing changing variables, such as a number of data streams on a source node (e.g., storage unit), a number of data streams on a destination node (e.g., another storage unit), network bandwidth, and/or a new set of incoming data on the source node. In some embodiments, a data structure, such as HyperLogLog (HLL)/HLL++, or LogLog based cardinality estimator, can be used. Accordingly, provided herein are systems and methods to estimate a time required for the completion of logical replication using a compact in-memory data structure to extract a total number of unique and duplicate data segments (or fingerprints) between a source logical space unit (e.g., Mtree) and all logical space units (e.g., Mtrees) in a deduplicated file system of a destination node, and characterizing important parameters, such as network bandwidth, number of data streams (on source and destination nodes), number of remote procedure calls (RPCs) taken for the deduplication.

In some embodiments, the use cases for predicting the total time required to complete a logical replication include the following:
(1) Backup and replication policies are configured by a system administrator (sysadmin) in such a way that replication windows (e.g., service-level agreements (SLAs)) can be met, for example if data ingestion takes 8 hours, it should be replicated within 12-16 hours so that replication lag does not get generated.
(2) In a customer environment where data storage appliances with backup and replication workload are actively running over a period of time, a significant replication lag is generated causing concerns and escalation from customers because maintaining replication windows (SLAs), as previously discussed, can be difficult due to different types of workloads, different generation of data types, different deduplication factors across data, and/or network bandwidth variations.

(3) It has become important to predict and report the total time required to complete replication at a given amount of time in single node environment as well as a global scale environment. Based on those estimations, users can plan for successive sets of actions for a new workload or manage existing workload in efficient ways.

According to one aspect, a computer-implemented method of determining a replication time in a deduplicated file system is provided. The method includes determining maximum streams based on a number of allocated streams on a source node and a number of allocated streams on a target node. The method further includes determining an available network bandwidth between the source node and the target node. The method further includes estimating a delta time based at least on one or more duplicate fingerprints between a logical space unit of the source node and the target node by using at least one source smart filter and at least one target smart filter. The method further includes determining the replication time based on the maximum streams, the available network bandwidth between the source and target nodes, the estimated delta time, and a number of unique fingerprints that exist between the logical space unit of the source node and the target node.

In an embodiment, the available network bandwidth between the source node and the target node is determined based on a throughput between the source and target nodes.

In an embodiment, the delta time is estimated based further on a time needed to send/receive a smallest batch of fingerprints.

In an embodiment, the number of unique fingerprints that exist between the logical space unit of the source node and the target node is determined based on (i) a cardinality of unique fingerprints in the logical space unit of the source node and (ii) a cardinality of a union of all logical space units of the target node.

In an embodiment, determining the number of unique fingerprints that exist between the logical space unit of the source node and the target node comprises determining the cardinality of the unique fingerprints in the logical space unit of the source node based on (i) an intersection cardinality of the logical space unit and deleted fingerprints by garbage collection and (ii) a cardinality of the logical space unit.

In an embodiment, determining the maximum streams comprises determining the maximum streams using a minimum function of the number of allocated streams on the source node and the number of allocated streams on the target node.

In an embodiment, the source smart filter and the target smart filter are implemented using HyperLogLog (HLL) or HLL++.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, replication logic 114, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

With continued reference to FIG. 1, in an embodiment, any of clients 101-102 may further include an optional deduplication logic (e.g., deduplication logic 151-152) having at least a portion of functionalities of deduplication logic 107. Deduplication logic 151-152 are configured to perform local deduplication operations, respectively. For example, prior to transmit data to storage system 104, each of the deduplication logic 151-152 may deduplicate the data into deduplicated segments and determine whether a particular deduplicated segment has already been stored in storage system 104. A deduplicated segment is transmitted to storage system 104 only if the deduplicated segment has not been stored in storage system 104.

For example, when client 101 is about to transmit a data stream (e.g., a file or a directory of one or more files) to storage system 104, deduplication logic 151 is configured to deduplicate the data stream into deduplicated segments. For each of the deduplicated segments, client 101 transmits a fingerprint or representative of the deduplicated segment to storage system 104 to determine whether that particular deduplicated segment has already been stored in storage system 104. A deduplicated segment that has been stored in storage system 104 may be previously received from the same client 101 or from another client such as client 102. In response to a response from storage system 104 indicating that the segment has not been stored in storage system 104, that particular segment is then transmitted over to the storage system 104. As a result, the network traffic or bandwidth and the processing resources required can be greatly reduced.

In an embodiment, replication logic 114 replicates an original file system on a replicated file system. The replicated file system can be accessed by both the replication logic and clients. To perform file replication, the replication logic may create, delete or modify files on the replicated file system. In some embodiments, clients 101-102 can read files on the replicated file system, but may not create, delete or modify files. In some embodiments, replication logic 114 duplicates the replicated file system based on the original file system during initialization. In some embodiments, to efficiently initialize the replicated file system, the original file system is copied to the replicated file system via a network connection or using removable storage media such as backup tapes or optical storage discs.

In some embodiments, data segments included in the original file system are copied to the replicated file system via removable storage media and initialization is completed via the network. The replication logic 114 updates changes to the original file system on the replicated file system, keeping the two file systems synchronized. The replication logic 114 may be implemented as a process and/or device separate from the storage system 104 and/or file systems, a process and/or device that is a part of one or both of the storage system 104 and/or file system, or any other appropriate means. For example, in some embodiments, the replication logic 114 is implemented as a standalone device capable of communicating with the file systems. It determines the necessary updates by communicating with the original file system, and sends the updates to the replicated file system. The replicated file system is configured to answer queries, accept the updates, and modify the contents in the file system accordingly. In some embodiments, the functions of replication logic 114 are implemented as separate processes on the storage system 104.

It is possible to represent files in other ways, such as using a mixture of byte sequences and references to byte sequences in other files. The byte sequences are treated as data segment. The identifiers used to reference the segments are substantially shorter than the segments themselves. Therefore, using identifiers allows more efficient use of available storage space. In some embodiments, the data segments and data segment identifiers are replicated on the replicated file system. In some embodiments, metadata of files are also updated. As used herein, metadata includes data associated with various attributes of the file, such as file name, file length, date stamp, permission, whether a file has been removed from the current file system, whether a file has been renamed, etc.

In some embodiment, only the files that have been updated or newly references are replicated. A file is deemed to have been updated if it has been modified in some way since the last replication, such as having been edited, created, renamed, deleted, had a permission change, etc. If the file has not been updated, nothing needs to be done to it in terms of replication. Any data segment that has been previously stored on the replicated file system, but is newly referenced by the file being processed is located. In some embodiments, a data segment is deemed to be newly referenced if it was not referenced by the file at the time of the last replication, as a data segment that has been added or modified since the last replication.

In some embodiments, a data segment is deemed to be newly referenced if it was never referenced by the file during the file's replication history, or was not referenced within some number of replications. A data segment may be previously stored on the replicated file system, but is still newly referenced by the file if the data segment was previously stored on the replicated file system by another file, by a client writing to the replicated file system, or by some other preloading/initialization mechanism. Since the data segments have been previously stored, they do not need to be replicated again on the replicated file system. Thus, greater efficiency in replication is achieved, especially in file systems where multiple files share a large amount of identical data. How to locate these previously stored data segments are discussed in more detail below. Further, data segments that have not been previously stored on the replicated file system are located and replicated on the replicated file system. It is possible in some situations that all the data segments included in the file have been previously stored on the replicated file system therefore no additional replication is necessary. It is also possible that there is no previously stored data segment and all the data segments in the file need to be replicated.

In some embodiments, a log record is used to track the file system operations, recording file updates as they occur. Depending on implementation, the entries in the log record may include segment references, content handles, metadata, and other information that can be used for executing operations to synchronize the replicated file system with the original file system. There are a number of ways a log entry is generated, including every time an event (such as file write) occurs, after several events occur, or at a predetermined frequency. In some embodiments, to capture more update information with fewer log entries, each log entry is generated only when a key event occurs, such as when a file closes, after a predetermined idle period has lapsed, when a snapshot of the file system is created, etc. During replication, the log record is processed, and updated files are determined based on log entries indicating file update operations such as file modification, file creation, etc.

In some embodiments, a snapshot is taken immediately before a replication starts. The snapshot records information of the file system at a point in time. It may be a snapshot of the entire file system, or a snapshot of one or more individual files. The snapshot may include information such as data segment references, content handles, etc. In some embodiments, prior to the next replication operation, the current states of the system are compared to a snapshot of the system to determine which files have been updated. In some embodiments, the current states of a file are compared to a snapshot of the file to determine whether the file has been updated.

In processing data segments, there are a number of ways to locate data segments that have not been stored previously on the replicated file system, some of which are described below although any other appropriate technique may be used. In some embodiments, log records are used. Log entries record operations on the original file system. In some embodiments, when a file is updated, a log entry including information about the file's data segment references is created. Offsets of the new data segment references, and other information that may assist in file replication are also recorded as appropriate. During replication, based on the log records of the new data segment references, it is determined whether the data segment being referenced has been stored already.

In some embodiments, upon receiving a query, the data segment reference on the replicated file system is looked up by replication logic 114 or the replicated file system in a database of stored data segment identifiers, to determine whether such a data segment has been stored previously, and provides a response based on the lookup result. In some embodiments, the data segment reference under evaluation is compared with the data segment references known at the time of last replication. The comparison can be carried out by the original file system or by the replication logic 114. If the data segment reference can be found in existing data segment references, it indicates that the corresponding data segment has already been stored. Else, the corresponding data segment may not have been stored and may need to be replicated. In some embodiments, all such segments are replicated. In other embodiments, a query of the replication logic 114 or replicated file system determines whether the segment is replicated or not as described above. In all cases, many segments are not replicated even though new references to those segments are. Thus, the available bandwidth of the storage system 104 and the network connecting them is more efficiently utilized.

In some embodiments, when a file is updated, a log entry including information about the file's content handle is created. In some embodiments, to reduce the amount of processing, a log entry including content handle information is created after multiple updates, or upon certain key event such as when a file is closed. The content handle indirectly references the data segments included in the file and may be analyzed to obtain data segment references.

Figure 2:
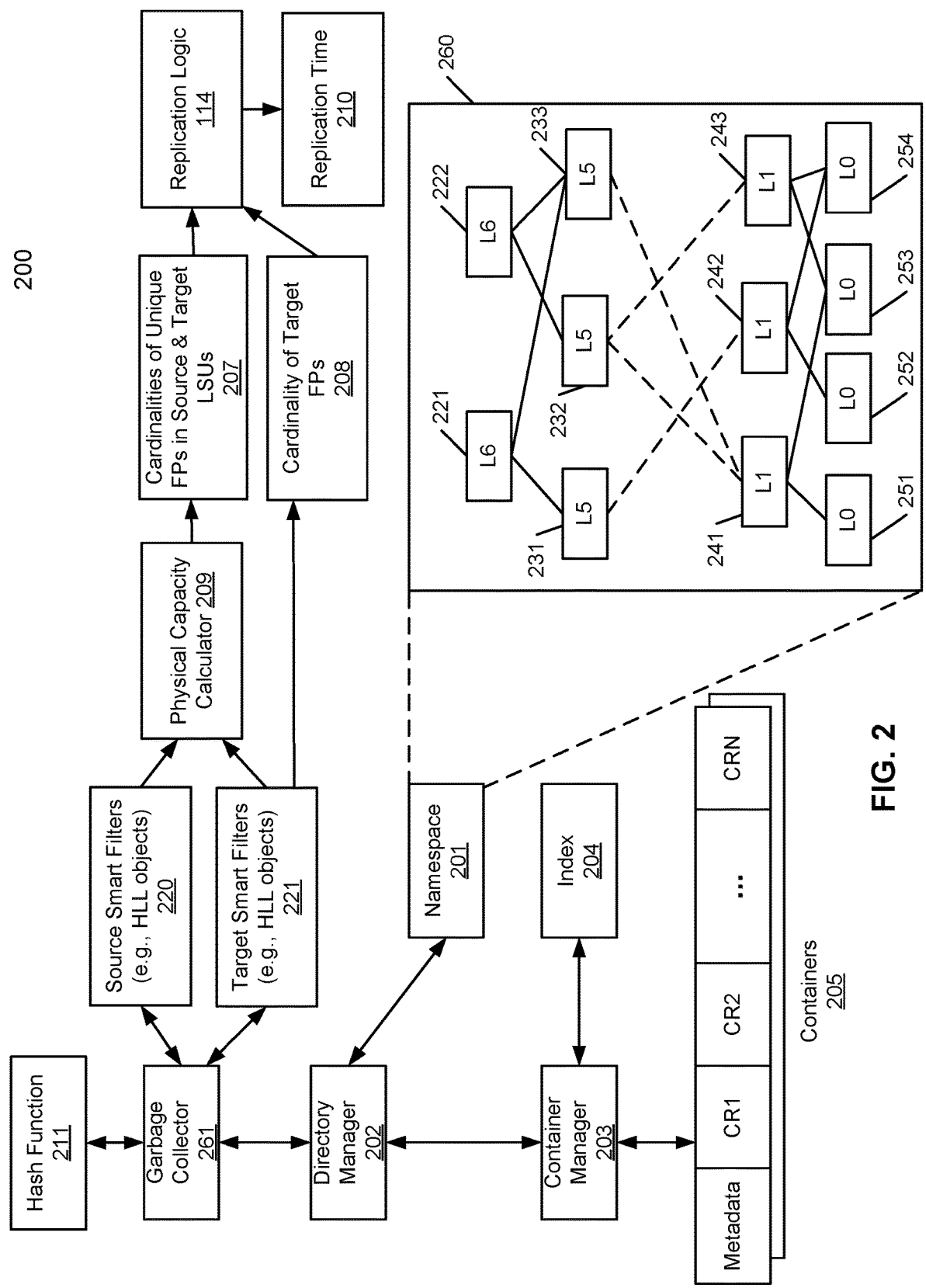
FIG. 2 is a block diagram illustrating a storage system according to another embodiment.

FIG. 2 is a block diagram illustrating a storage system according to one embodiment of the invention. System 200 may be implemented as part of storage system 104 of FIG. 1. Referring to FIG. 2, garbage collector 261 traverses namespace 201 via directory manager 202, where directory manager 202 is configured to manage files stored in a file system of the storage system. In a deduplicated file system, a file may be represented in a logical space unit 260 (such as a file tree, e.g., Merkle or Mtree) having one or more levels of segments in a multi-level hierarchy. Thus, multiple logical space units may exist in the deduplicated file system. In this particular example, there are seven levels L0 to L6 in logical space unit 260, where L6 is the root level, also referred to as a top parent level. More or fewer levels may be applied herein. Each upper level contains one or more references to one or more lower level segments. In an embodiment, an upper level segment contains a fingerprint (e.g., metadata) of fingerprints of its child level segments. Only the lowest level segments are the actual data segments containing the actual deduplicated segments. Thus, L1 to L6 are segments only contain metadata of their respective child segments(s), referred to herein as Lp segments.

In one embodiment, when garbage collector 261 traverses namespace 201 via directory manager 202, it obtains the fingerprints of the root level segments, in this example, L6 segments, as part of content handles from namespace 201. Based on the fingerprints of the current level segments, container manager 203 can identify which of the containers 205 in which the segments are stored based on indexing information from index 204. Index 204 may be maintained in the system memory (e.g., volatile memory) and/or in a storage device (e.g., non-volatile memory). Index 204 includes information mapping a fingerprint to a storage location that stores a segment represented by the fingerprint. In one embodiment, index 204 may be a fingerprint-to-container identifier (FP/CID) index that maps a particular fingerprint to a container that contains the corresponding segment or a compression region (CR) having the segment stored therein.

The metadata (e.g., fingerprints) and the data section of the current level segments can be obtained from the identified container. A container may contain metadata or fingerprints of all segments stored therein, where segments are compressed into a compression region. A segment can be obtained by retrieving the entire container or the corresponding compression region from the storage device or disk. Based on the metadata or the data section of a current level segment, its child segment or segments can be identified, and so on. Throughout this application, for the purpose of illustration, a container contains one or more compression regions and each compression region contains one or more segments therein. However, the techniques may also be applied to other storage layouts.

With continued reference to FIG. 2, in an embodiment, there are two components responsible to manage the files in the system. The first one is directory manager 202, which is a hierarchical mapping from the path to the inode representing a file. The second one is a content store (not shown), which manages the content of the file. Each file has a content handle (CH) that is stored in the inode that is created by content store every time the file content changes. Each CH represents a file that is abstracted as a logical space unit (e.g., logical space unit 260) of segments. In this example, a logical space unit can have up to 7 levels: L0, ..., L6. The L0 segments represent user data (e.g., actual data) and are the leaves of the tree. The L6 is the root of the segment tree. Segments from L1 to L6 are referred to as metadata segments or Lp segments. They represent the metadata of the file. An L1 segment is an array of L0 references. Similarly an L2 is an array of L1 references and so on. A segment is considered live if it can be referenced by any live content in the file system.

The file system packs the segments into containers 205 which are written to a disk in a log-structured manner. The log-structured container set has a log tail and a log head. New containers are always appended at the head of the log. Each container is structured into sections. The first section is the metadata section and the following sections are compression regions. A compression region is a set of compressed segments. In the metadata section all the references or fingerprints that identify the segments in the container. The metadata further includes information identifying a content type, which describes the content of the container. For instance, it describes which compression algorithm has been used, which type of segments the container has (L0, ..., L6), etc. Container manager 203 is responsible to maintain the log-structured container set and provide a mapping from container identifiers (CID) to block offset on disk. This mapping may be maintained in memory. It also contains additional information, e.g., the content type of each container.

In the example as shown in FIG. 2, segment 221 includes a fingerprint of fingerprints of segments 231 and 233, and segment 222 includes a representation (e.g., a fingerprint) of fingerprints of segments 232-233, and so on. Some of the segments, such as segment 233, are referenced shared by multiple parent level segments (e.g., segments 221-222). Thus, segments 221-222, 231-233, and 241-243 only contain data representing the metadata of their respective child segments. Only segments 251-254 contain the actual user data.

In an embodiment, directory manager 202 (or another processing logic) may populate and maintain a smart filter (e.g., HLL/HLL++ object or data structure) in the storage system for each logical space unit in a source node (e.g., storage unit 108 of FIG. 1) and for each logical space unit in a destination or target node (e.g., storage unit 109 of FIG. 1). The smart filter may be an 80 KB smart filter stored in a directory manager (DM) attribute (e.g., Btree). Thus, multiple source smart filters 220 and multiple target smart filters 221 may be populated for the source and target nodes, respectively, and maintained in system 200 prior to the traversal or processing of the logical space units. In an embodiment, smart filters 220-221 may be implemented using HLL/HLL++. The processing of a smart filter has been previously described in patent application Ser. No. 17/304,106, entitled "Systems and Methods for Physical Capacity Estimation of Logical Space Units", the disclosure of which is incorporated herein by reference.

In an embodiment, when a segment has been processed or traversed (e.g., by garbage collector 261), the fingerprint or metadata of the segment is applied to a hash function 211 (e.g., collision-free hash function) which yields a hash value. In one embodiment, hash function 211 is a perfect hash function. A perfect hash function for a set S is a hash function that maps distinct elements in S to a set of integers, with no collisions. A perfect hash function has many of the same applications as other hash functions, but with the advantage that no collision resolution has to be implemented.

In an embodiment, hash function 211 is generated based on the fingerprints of the segments (e.g., a set of fingerprints) stored in the storage system prior to performing the traversal of the namespace 201. That is, prior to performing any garbage collection, a processing logic such as garbage collector 261 may scan all fingerprints of the segments that are involved in the garbage collection to generate a collision-free hash function for those involved segments. If the garbage collection is performed based on a subset of segments (e.g., a range of fingerprints), for each subset, a corresponding hash function may be specifically generated based on the fingerprints of the segments involved in that particular subset.

In an embodiment, the hash values returned by hash function 211 may be used to index into one or more registers (also referred to as buckets) of a smart filter (e.g., a source smart filter 220 or target smart filter 221). A register may include one or more fingerprints of a corresponding logical space unit (in source or target node), or one or more deleted fingerprints by garbage collector 261. Each smart filter may combine cardinality estimates of its registers to produce a cardinality of its corresponding logical space unit or deleted fingerprints (by garbage collector 261). Thus, though not shown in FIG. 2, smart filters 220 and smart filters 221 may produce or estimate multiple cardinalities of respective logical space units (LSUs) (in source and target nodes, respectively) and one or more cardinalities of deleted fingerprints (FPs). Furthermore, each smart filter may compute or estimate a cardinality of the union of its corresponding logical space unit and another logical space unit. Thus, multiple cardinalities of unions of LSUs may be produced or estimated by smart filters 220 and smart filters 221. Also, a smart filter may calculate or estimate a cardinality of the union of its corresponding logical space unit and deleted FPs (by garbage collector 261).

Based on the cardinalities of LSUs and deleted FPs, cardinalities of unions of LSUs and cardinalities of union of LSU and deleted FPs, physical capacity calculator 209 may determine the physical size (or physical capacity) of each logical space unit in system 200 (e.g., in source and target nodes). For example, using the various cardinalities (described above), physical capacity calculator 209 may determine an intersection cardinality of a first logical space unit (e.g., Mtree1) and a second logical space unit (e.g., Mtree2) and also an intersection cardinality of a logical space unit (e.g., Mtree1) and the deleted FPs. Based on the cardinalities and the determined intersection cardinalities, physical capacity calculator 209 may determine or estimate a cardinality of unique fingerprints exist in each logical space unit (in source and target nodes). Thus, physical capacity calculator 209 may produce a number of cardinalities of unique fingerprints in source and target logical space units 207. For each logical space unit (in source or target node), using the cardinality of the unique fingerprints in the logical space unit and an L0 average segment size of the logical space unit, physical capacity calculator 209 can determine the physical size (or physical capacity) of the logical space unit (e.g., logical space unit 260).

In more detail, in an embodiment, a smart filter 220/221 (associated with source or target node) may be populated by performing a director manager (DM) enumeration followed by an Lp scan of a corresponding logical space unit (e.g., in source or target node). There are several ways in which the capacity of the logical space unit can be computed incrementally. For instance, when a file is ingested and during file verification, a logical space unit (e.g., logical space unit 260) can be scanned through and fingerprints in the logical space unit (e.g., L0 fingerprints) can be dumped or added in a smart filter 220/221 associated with the logical space unit (in source or target node). Thus, for each logical space unit, a smart filter 220/221 may be populated using file verification at the start with the assumption that garbage collector 261 was not run. Performing this at the logical space unit level directly would enable the file verification to dump L0 fingerprints into the smart filter 220/221 associated with the logical space unit (in source or target node). However, this may need an extra operation to identify the cardinality of the smart filter 220/221 by comparing that cardinality against a cardinality of another smart filter 220/221 maintained by garbage collector 261. In an embodiment, a smart filter 220/221 may be stored for every logical space unit in DM attribute data structure (e.g., B-tree). As an example, each page of the DM attribute data structure may be 64 KB (though the page can be of any size), so the number of pages used may be based on the size of the smart filter 220/221 and the total number of fingerprints in system 200. For example, for thousands of billions of fingerprints, about 1-4 pages may be used given the nature of the data structure used by smart filter 220/221 (e.g., HLL/HLL++ data structure). In a maximum case with 256 logical space units (e.g., Mtrees) and 4 pages for a smart filter 220/221 per logical space unit, for example, about 256*64*4≈64 MB are needed for all smart filters and all logical space units (in a worst case scenario).

In an embodiment, during garbage collection run, another smart filter 220/221 may need to be maintained, where the fingerprints getting deleted can be added or dumped into the smart filter 220/221. Even with a large number of fingerprints (e.g., in the range of billions), the size required for the smart filter 220/221 is very small, and thus it can be populated without any collision.

In an embodiment, while reporting the physical capacity of a number logical space units (e.g., LSU1, LSU2, LSU3, . . . , LSUn) in source or target node, at least two smart filters 220/221 are needed to be considered at a given time. The more number of logical space units exist in the system 200, the more common segments may exist among them. For example, the cardinality of a first logical space unit (LSU1), e.g., Mtree1, using a first smart filter is |LSU1|. After garbage collection, the cardinality of the deleted fingerprints using a second smart filter is |Deleted FPs|. Next, physical capacity calculator 209 may determine or estimate the cardinality of the total unique fingerprints (FPs) that exist in LSU1 by using a union functionality (in the smart filter 220/221) to find out an intersection between the deleted fingerprints (by garbage collection) and LSU1. The intersection may be performed to calculate the number of segments in LSU1 that are freed by garbage collection, and it can be determined as follows:

(Unique FPs in LSU1)=|LSU1|−(|LSU1∩|Deleted FPs|), where (|LSU1∩|Deleted FPs|)=|LSU1|+|Deleted FPs|−(|LSU1∪|Deleted FPs|).

For a subsequent logical space unit (LSU2), the calculation is different. In an embodiment, physical capacity calculator 209 may determine or estimate the cardinality of the total unique FPs that exist in LSU2 as follows:

(Unique FPs in LSU2)=(|LSU2|−|Deleted FPs|)−(|LSU1∩|LSU2|), where (|LSU1∩|LSU2|)=|LSU1|+|LSU2|−∪|LSU2|).

The above algorithms or formulas can be expanded for other LSUs (e.g., LSU3, LSU4, . . . , LSUn) in source or target node.

In an embodiment, every time garbage collection is run, a new smart filter 220/221 (depending on source or destination node) needs to be maintained. As such, an older smart filter needs to be saved so that when physical capacity is reported, the older smart filter can be used for extracting identical fingerprints and then reporting the physical capacity. In an embodiment, the older smart filter can be stored in an attribute data structure (e.g., B-tree), written in a form of a container, or stored in a memory during physical capacity reporting (PCR) initialization.

In an embodiment, smart filter 220/221 may not have the mechanism to selectively delete hashes included in the smart filter, so the above-described method is needed to track the deleted segments by garbage collector 261. Thus, this provides the ability to track the deleted segments in each logical space unit (e.g., Mtree). In an embodiment, similar to a garbage collection schedule, a new smart filter per logical space unit can be formed and an older smart filter can be terminated based on a schedule.

After the number of unique fingerprints that exist in a logical space unit (in source or target node) can be determined or estimated, in an embodiment, physical capacity calculator 209 needs to determine an L0 average segment size in the logical space unit. The method to determine the L0 average segment size is generally well known to people skilled in the art. Based on the number of unique fingerprints and the L0 average segment size, physical capacity calculator 209 can estimate the total physical size or capacity of the logical space unit by taking, for example, the product of the number of unique fingerprints and the L0 average segment size.

In an embodiment, target smart filters 221 may include a smart filter that produces or estimates a cardinality of target fingerprints 208 (e.g., cardinality of a union of all logical space units (e.g., Mtrees) of the target node), which may be referred to as |Target Node FPs|.

Based on the foregoing information (e.g., cardinalities of unique fingerprints in source and target logical space units 207 and cardinality of target fingerprints 208), replication logic 114 (or another logic) may calculate unique fingerprints/segments that exist between a source logical space unit (e.g., Mtree1) and a target node using smart filters 220-221 and maintain those calculated unique fingerprints/segments in a DM attribute (e.g., Btree).

For example, the unique fingerprints that exist between a first logical space unit on a source node (Source LSU1) and the target node can be determined as follows:

|Source LSU1∩|Target Node FPs|=|Source LSU1|+|Target Node FPs|−(|Source LSU1∪|Target Node FPs|), where |Source LSU1| is the cardinality of unique fingerprints in the first logical space unit of the source node.

Based on the above, replication logic 114 can estimate the time required (at replication level) to calculate a total time required for replication to complete at a given time (illustrated as replication time 210 in FIG. 2).

Figure 3:
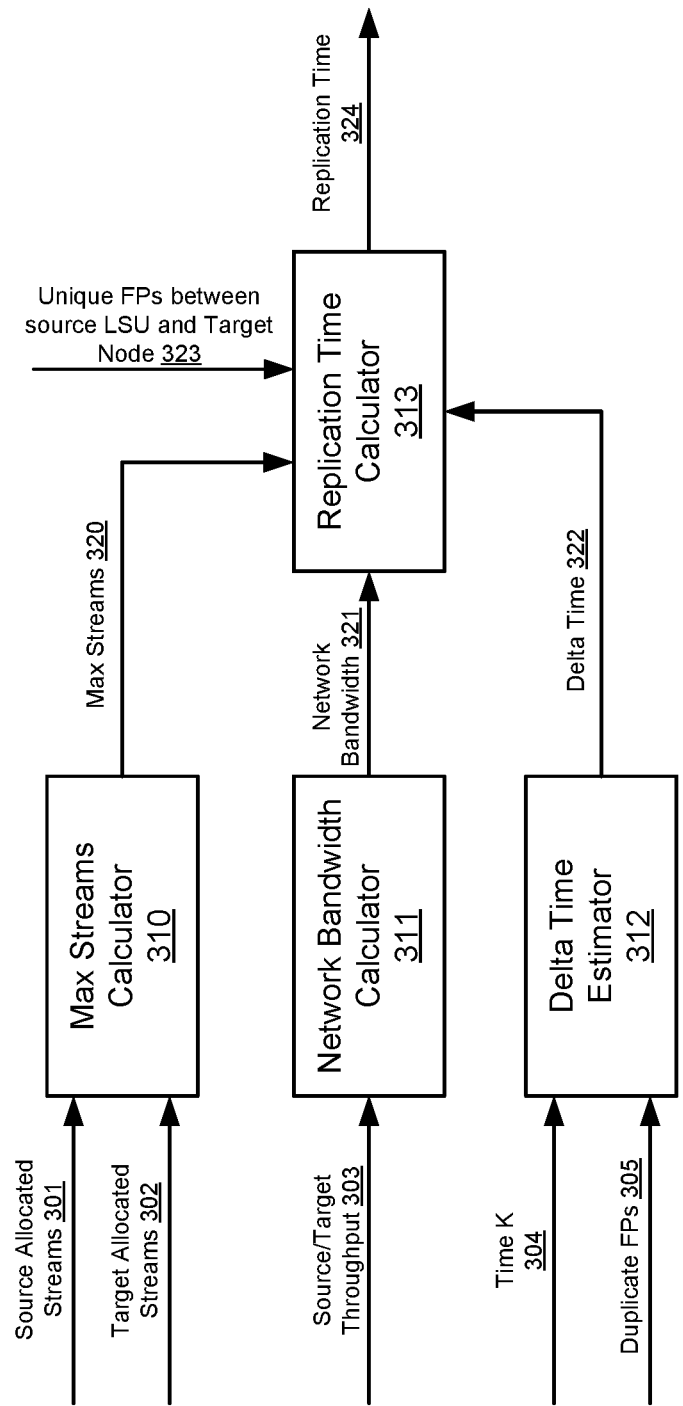
FIG. 3 is a block diagram illustrating a system for determining a replication time according to an embodiment.

FIG. 3 is a block diagram illustrating a system for determining a replication time according to an embodiment. System 300 may be implemented as part of replication logic 114 of FIG. 2 or another logic. Referring to FIG. 3, system 300 includes maximum streams calculator 310, network bandwidth calculator 311, delta time estimator 312 and replication time calculator 313.

In an embodiment, if the number of allocated streams on a source node (referred to as source allocated streams 301) is greater than the number of allocated streams on a destination or target node (referred to as target allocated streams 302), then target allocated streams 302 are selected. Thus, maximum streams calculator 310 may determine the maximum streams (MS) 320 using a minimum function, as follows:

MS=Min (SS, DS), where SS is source allocated streams 301 and DS is target allocated streams 302.

In an embodiment, network bandwidth calculator 311 may calculate a network bandwidth 321 available between a source node and a target node based on a throughput 303 (e.g., iPerf throughput) between the source node and/or target node. In another embodiment, the network bandwidth 321 can be computed internally using, for example, socket/network GNU C Library (commonly known as glibc) application programming interfaces (APIs). To do so, for example, a program may transfer and receive data (e.g., transfer bytes/receive bytes), sleep for a period of time (e.g., some seconds), again transfer and receive data, obtain the differences, and provide results at a specific rate (e.g., in Megabits per second).

In an embodiment, delta time estimator 312 may determine or estimate a delta time 322 required for common/shared segments or fingerprints (i.e., if all or a subset of segment references in a given file exist on the target node). For example, consider there are duplicate files or many duplicate data blocks/segments (or fingerprints) on the target node. Thus, a replication would perform two RPCs of send references (send_refs) and receive references (receive_refs) which time is very small, though it is considered in the case of large files or many duplicate segments or fingerprints. In an embodiment, delta time estimator 312 may calculate delta time 322 based on a number of duplicate fingerprints 305 between a source logical space unit (e.g., Mtree) and a target node using smart filters (as previously described) and a constant time K 304 for sending a batch of references and receiving a batch of references. In an embodiment, delta time estimator 312 may calculate delta time 322 as follows:

$DE=(K*\text{Duplicate fingerprints between source logical space unit and target node})$, where $K$ is the time needed to send/receive a smallest batch of fingerprints.

Based on maximum streams 320, network bandwidth 321, delta time 322, and unique fingerprints 323 that exist between the source logical space unit and the target node, replication time calculator 313 may determine a replication time 324 (which may be the replication time 210 of FIG. 2). In an embodiment, replication time 324 may be calculated as follows:

Replication Time=$(US*\text{average size per segment}*8)/(NB*MS)+DE$, where

US are the unique fingerprints that exist between the source logical space unit and the target node, NB is network bandwidth 321, MS is maximum streams 320, and DE is delta time 322.

In some embodiments, the foregoing solution can be extended for cases such as if replication is stopped in between and continuous data ingestion occurs on a source logical space unit, then maintaining a smart filter for a small subset of recently changed files and using the foregoing operations and performing a union and intersection with other sets can provide the most probabilistic accurate estimates. The foregoing solution can also be extended for a managed file replication (MFR) and directory replication.

Figure 4:
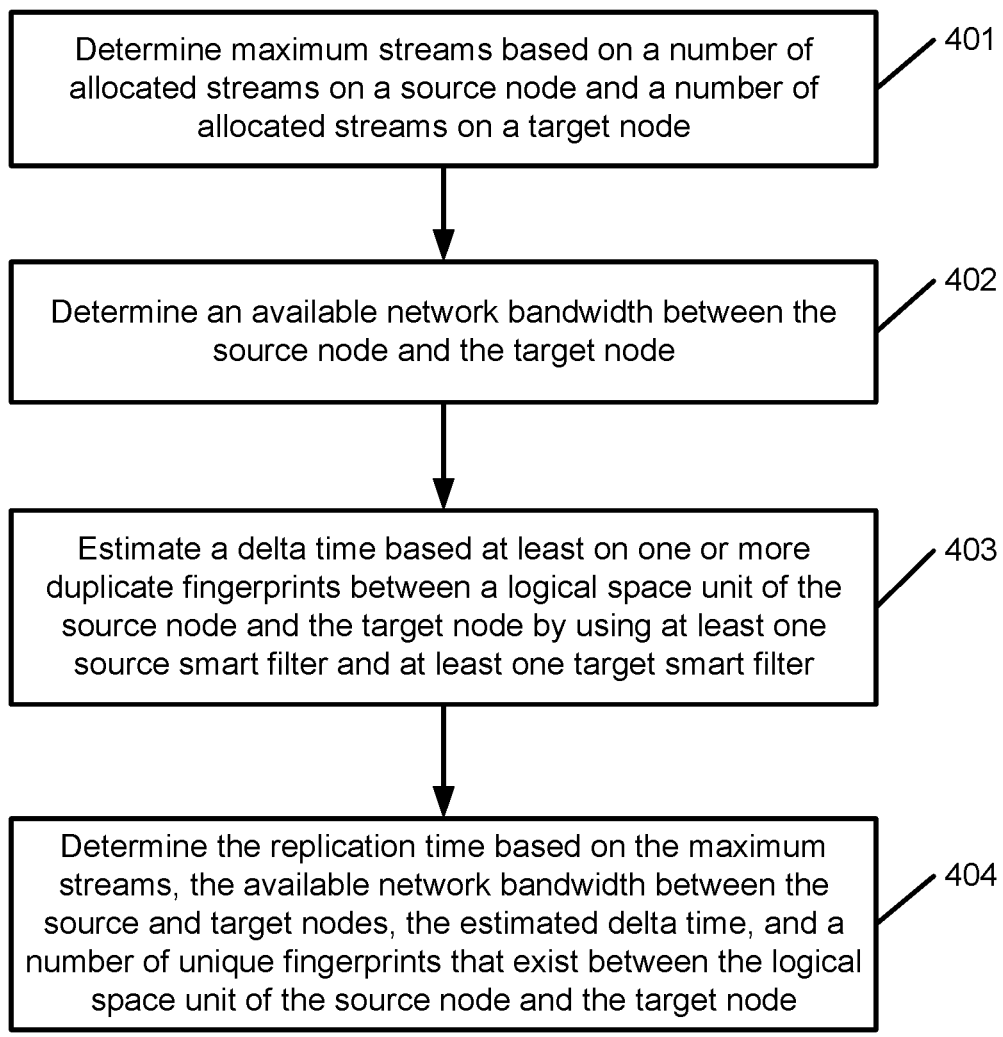
FIG. 4 is a flow diagram illustrating a process of determining a replication time in a data deduplication system according to an embodiment.

FIG. 4 is a flow diagram illustrating a process of determining a replication time in a deduplicated file system according to an embodiment. Process 400 may be performed by processing logic that includes hardware (e.g. circuitry, dedicated logic, etc.), software (e.g., embodied on a non-transitory computer readable medium), or a combination thereof. For example, process 400 may be performed by replication logic 114 of FIG. 1. Referring to FIG. 4, at block 401, the processing logic determines maximum streams based on a number of allocated streams on a source node and a number of allocated streams on a target node. At block 402, the processing logic determines an available network bandwidth between the source node and the target node. At block 403, the processing logic estimates a delta time based at least on one or more duplicate fingerprints between a logical space unit of the source node and the target node by using at least one source smart filter and at least one target smart filter. At block 404, the processing logic determines the replication time based on the maximum streams, the available network bandwidth between the source and target nodes, the estimated delta time, and a number of unique fingerprints that exist between the logical space unit of the source node and the target node.

Note that some or all of the components as shown and described above (e.g., replication logic 114 of FIG. 1, smart filters 220-221 and physical capacity calculator 209 of FIG. 2) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 5:
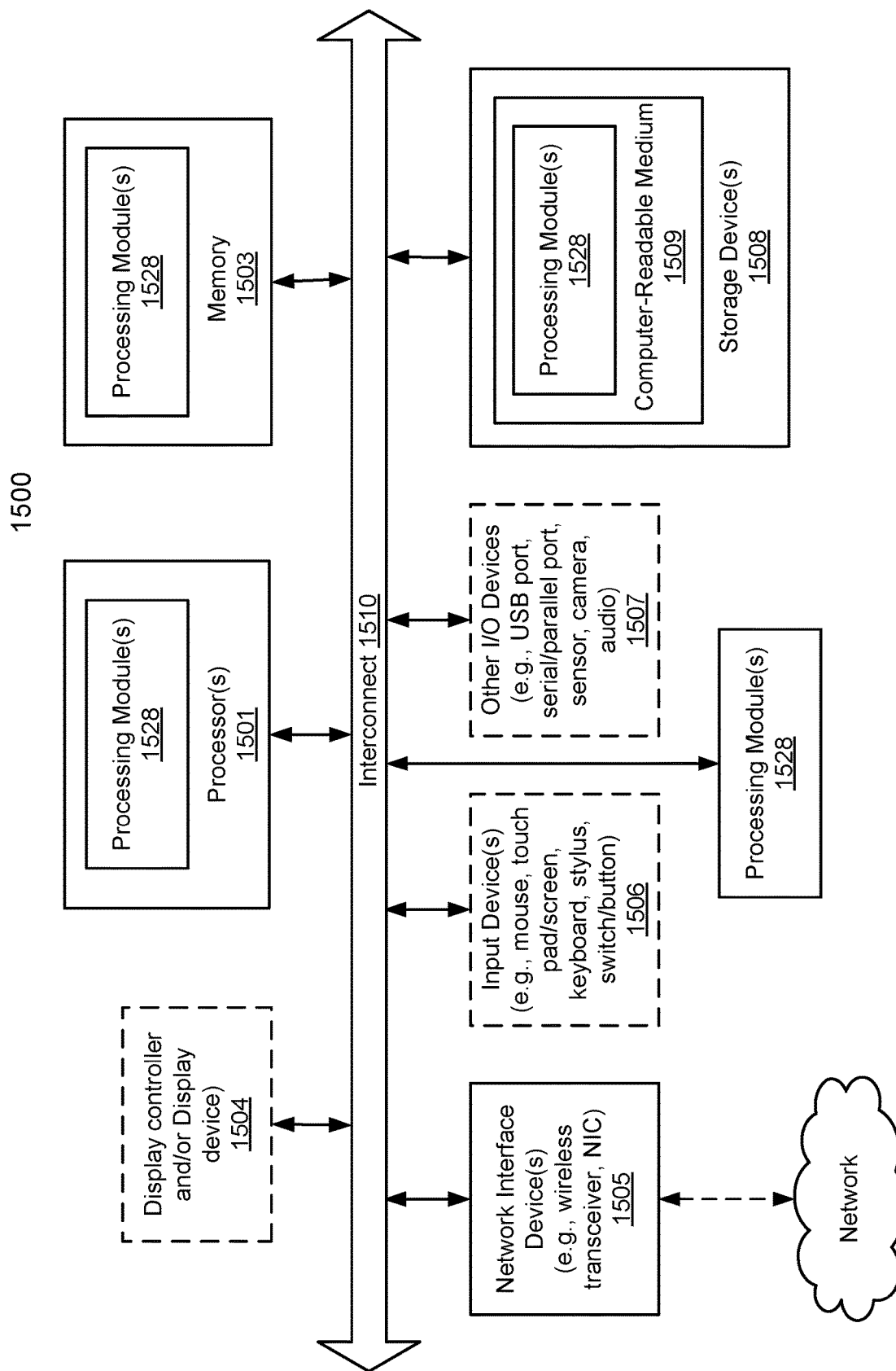
FIG. 5 is a block diagram illustrating a data processing system according to an embodiment.

FIG. 5 is a block diagram illustrating an example of a data processing system which may be used with an embodiment. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, a storage service logic 106, a deduplication engine 107, replication logic 114, smart filters 220-221, physical capacity calculator 209, etc., as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method of determining a replication time in a deduplicated file system, the method comprising:
   determining maximum streams based on a number of allocated streams on a source node and a number of allocated streams on a target node;
   determining an available network bandwidth between the source node and the target node;
   estimating a delta time based at least on one or more duplicate fingerprints between a logical space unit of the source node and the target node by using at least one source smart filter and at least one target smart filter; and
   determining the replication time based on the maximum streams, the available network bandwidth between the source and target nodes, the estimated delta time, and a number of unique fingerprints that exist between the logical space unit of the source node and the target node.

2. The method of claim 1, wherein determining the available network bandwidth between the source node and the target node is based on a throughput between the source and target nodes.

3. The method of claim 1, wherein estimating the delta time is further based on a time needed to send/receive a smallest batch of fingerprints.

4. The method of claim 1, further comprising: determining the number of unique fingerprints that exist between the logical space unit of the source node and the target node based on (i) a cardinality of unique fingerprints in the logical space unit of the source node and (ii) a cardinality of a union of all logical space units of the target node.

5. The method of claim 4, wherein determining the number of unique fingerprints that exist between the logical space unit of the source node and the target node comprises determining the cardinality of the unique fingerprints in the logical space unit of the source node based on (i) an intersection cardinality of the logical space unit and deleted fingerprints by garbage collection and (ii) a cardinality of the logical space unit.

6. The method of claim 1, wherein determining the maximum streams comprises determining the maximum streams using a minimum function of the number of allocated streams on the source node and the number of allocated streams on the target node.

7. The method of claim 1, wherein the at least one source smart filter and the at least one target smart filter are implemented using HyperLogLog (HLL) or HLL++.

8. A non-transitory machine-readable medium having instructions stored therein, which when executed by a processor, cause the processor to perform operations, the operations comprising:
determining maximum streams based on a number of allocated streams on a source node and a number of allocated streams on a target node;
determining an available network bandwidth between the source node and the target node;
estimating a delta time based at least on one or more duplicate fingerprints between a logical space unit of the source node and the target node by using at least one source smart filter and at least one target smart filter; and
determining a replication time based on the maximum streams, the available network bandwidth between the source and target nodes, the estimated delta time, and a number of unique fingerprints that exist between the logical space unit of the source node and the target node.

9. The non-transitory machine-readable medium of claim 8, wherein determining the available network bandwidth between the source node and the target node is based on a throughput between the source and target nodes.

10. The non-transitory machine-readable medium of claim 8, wherein estimating the delta time is further based on a time needed to send/receive a smallest batch of fingerprints.

11. The non-transitory machine-readable medium of claim 8, wherein the operations further comprise: determining the number of unique fingerprints that exist between the logical space unit of the source node and the target node based on (i) a cardinality of unique fingerprints in the logical space unit of the source node and (ii) a cardinality of a union of all logical space units of the target node.

12. The non-transitory machine-readable medium of claim 11, wherein determining the number of unique fingerprints that exist between the logical space unit of the source node and the target node comprises determining the cardinality of the unique fingerprints in the logical space unit of the source node based on (i) an intersection cardinality of the logical space unit and deleted fingerprints by garbage collection and (ii) a cardinality of the logical space unit.

13. The non-transitory machine-readable medium of claim 8, wherein determining the maximum streams comprises determining the maximum streams using a minimum function of the number of allocated streams on the source node and the number of allocated streams on the target node.

14. The non-transitory machine-readable medium of claim 8, wherein the at least one source smart filter and the at least one target smart filter are implemented using HyperLogLog (HLL) or HLL++.

15. A data processing system, comprising:
a processor; and
a memory coupled to the processor to store instructions, which when executed by the processor, cause the processor to perform operations, the operations including:
determining maximum streams based on a number of allocated streams on a source node and a number of allocated streams on a target node;
determining an available network bandwidth between the source node and the target node;
estimating a delta time based at least on one or more duplicate fingerprints between a logical space unit of the source node and the target node by using at least one source smart filter and at least one target smart filter; and
determining a replication time based on the maximum streams, the available network bandwidth between the source and target nodes, the estimated delta time, and a number of unique fingerprints that exist between the logical space unit of the source node and the target node.

16. The data processing system of claim 15, wherein determining the available network bandwidth between the source node and the target node is based on a throughput between the source and target nodes.

17. The data processing system of claim 15, wherein estimating the delta time is further based on a time needed to send/receive a smallest batch of fingerprints.

18. The data processing system of claim 15, wherein the operations further include: determining the number of unique fingerprints that exist between the logical space unit of the source node and the target node based on (i) a cardinality of unique fingerprints in the logical space unit of the source node and (ii) a cardinality of a union of all logical space units of the target node.

19. The data processing system of claim 18, wherein determining the number of unique fingerprints that exist between the logical space unit of the source node and the target node comprises determining the cardinality of the unique fingerprints in the logical space unit of the source node based on (i) an intersection cardinality of the logical space unit and deleted fingerprints by garbage collection and (ii) a cardinality of the logical space unit.

20. The data processing system of claim 15, wherein the at least one source smart filter and the at least one target smart filter are implemented using HyperLogLog (HLL) or HLL++.

* * * * *